(12) United States Patent
Porikli

(10) Patent No.: US 6,885,765 B2
(45) Date of Patent: Apr. 26, 2005

(54) METHOD FOR DETERMINING COMPACTNESS RATIOS OF MULTIPLE DATA AND SIGNAL SETS

(75) Inventor: Fatih M. Porikli, North Plainfield, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 714 days.

(21) Appl. No.: 09/826,048

(22) Filed: Apr. 4, 2001

(65) Prior Publication Data

US 2002/0181778 A1 Dec. 5, 2002

(51) Int. Cl.$^7$ ............................. G06K 9/62; G06K 9/00
(52) U.S. Cl. ....................... 382/159; 382/160; 382/165; 382/170
(58) Field of Search ................................. 382/133, 159, 382/160, 164, 165, 170, 171, 172, 173, 175, 176, 177, 179, 180, 181, 190, 224, 225–229; 348/408.1, 414.1, 415.1, 416.1, 417.1, 418.1

(56) References Cited

U.S. PATENT DOCUMENTS

| | | | | |
|---|---|---|---|---|
| 5,887,073 A | * | 3/1999 | Fazzari et al. | 382/110 |
| 5,933,519 A | * | 8/1999 | Lee et al. | 382/133 |
| 6,058,212 A | * | 5/2000 | Yokoyama | 382/236 |
| 6,185,314 B1 | * | 2/2001 | Crabtree et al. | 382/103 |
| 6,263,088 B1 | * | 7/2001 | Crabtree et al. | 382/103 |
| 6,295,367 B1 | * | 9/2001 | Crabtree et al. | 382/103 |
| 6,690,823 B1 | * | 2/2004 | Holt et al. | 382/173 |

OTHER PUBLICATIONS

Jain et al., "Data Clustering: A Review"; ACM Computing Surveys, vol. 31, No. 3, Sept. 1999, pp. 264–323.

* cited by examiner

Primary Examiner—Samir Ahmed
Assistant Examiner—Brian Le
(74) Attorney, Agent, or Firm—Dirk Brinkman; Andrew J. Curtin

(57) ABSTRACT

A method determines a compactness ratio for data sets by first measuring a combined compactness value for a union of the data sets, and second, by measuring an individual compactness value for each one of the data set. The combined compactness value is then divided by a sum of the individual compactness values to determine the compactness ration of the data sets.

6 Claims, 2 Drawing Sheets

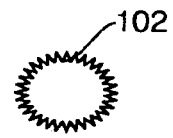
FIG 1a  FIG 1b
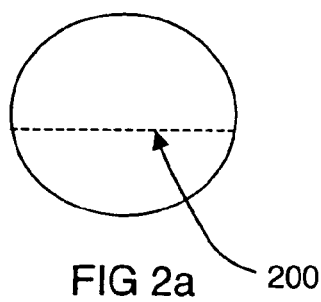
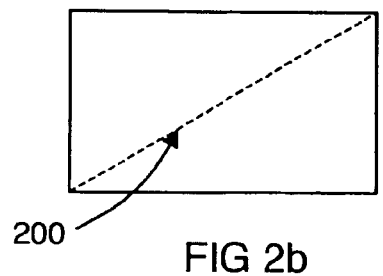
FIG 2a  FIG 2b
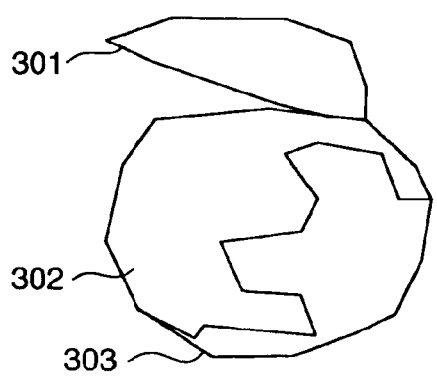
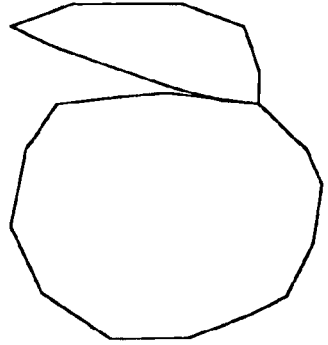
FIG 3a  FIG 3b

METHOD FOR DETERMINING COMPACTNESS RATIOS OF MULTIPLE DATA AND SIGNAL SETS

RELATED APPLICATION

This application is related to U.S. patent application Ser. No. 09/826,333 "Method for Segmenting Multi-Resolution Video Objects" filed by Porikli et al. on, Apr. 4, 2004.

FIELD OF THE INVENTION

The present invention relates generally to classifying information patterns, and more particularly to merging and segmenting sets of signals and data.

BACKGROUND OF THE INVENTION

Modern systems and data processing methods can produce an enormous of amount of information in the form of data or signals. For example, in the field of video analysis, a ten second video sequence can have in excess of $10^8$ of pixels, each pixel having associated color and intensity values. Analyzing such a large amount of information, for example, video segmentation for MPEG-4, requires specialized techniques such as clustering and segmentation.

Clustering

Clustering can be defined as an unsupervised classification of information into groups, i.e., clusters. Clustering is used in many scientific, engineering, and data processing applications as one step during information analysis. More specifically, clustering is frequently used in pattern-analysis, grouping, decision making, machine-learning situations, data mining, document retrieval, image segmentation, and pattern classification.

However, in many such problems, there is little prior knowledge available, e.g., statistical models, about the information being analyzed. For example, in most videos, the various scenes or "shots," bear no relationship to each other. Analyzing one scene usually provides no useful knowledge on how to analyze the next scene. Therefore, the processes that operate on the information must make certain assumptions about underlying structures. It is under these conditions that clustering processes are particularly appropriate for exploring interrelationships of the signal or data sets that form the information, so that an assessment, perhaps preliminary, of their structure can be made.

Known clustering techniques typically use either hierarchical or partitional methods, see Jain et al., *"Data Clustering: A Review,"* ACM Computing Surveys, Vol. 31, No. 3, pp. 264–323, 1999. Hierarchical methods produce a nested series of partitions, while partitional methods produce only a single partition.

Hierarchical Clustering

Most hierarchical clustering methods are variants of a single-link or complete-link methods. In the single-link method, the "distance" between two clusters is a minimum of all of the distances between all pairs of patterns, e.g., data vectors, drawn from the two clusters. Distances can be Euclidean or Hamming distances, for example. Each pair has one pattern drawn from the first cluster, and one pattern from the second cluster. The single link method suffers from a chaining effect, and also has a tendency to produce clusters that are straggly or elongated, see Naggy, *"State of Art in Pattern Recognition,"* Proc. IEEE, no: 56, 1968.

In the complete-link method, the distance between two clusters is the maximum of all pair-wise distances between patterns in the two clusters. The complete-link method produces tightly bound clusters, but it is highly sensitive to possible outliers. In both cases, two clusters are merged to form a larger cluster based on the distance criteria, and both methods require a considerable amount of computation.

Partitional Clustering

A partitional clustering method yields a single partition of the data instead of a clustering structure, such as a dendrogram (multi-resolution tree) produced by the hierarchical methods. Squared-error methods, k-means clustering, graph-theoretic divisive clustering, fuzzy clustering, and mode-seeking methods are examples of partitional clustering methods. Partitional methods have advantages in applications involving very large data sets where constructing a dendrogram is computationally prohibitive.

One problem with partitional clustering methods is the choice of the number of the desired output clusters. A combinatorial search of the set of all possible labelings for an optimum value of a criterion is clearly computationally prohibitive. Therefore, the partitional clustering methods are typically iterative. A different starting state is selected for each iteration, and the best configuration obtained from all of the iterations constitute the output cluster. As a characteristic, clustering methods do not consider the "compactness" of the output clusters.

Compactness has been used as a self-describing shape-based feature in various applications, see *"Compactness in Semantics for Merge and Fair Merge,"* Clarke et al. editors, Proceedings of 4th Workshop on Logics of Programs, volume 164 of Lecture Notes in Computer Science, pages 18–33, 1983, Grosser et al., *"Compactness conditions in topological groups,"* Reine Angew. Math., 246, pp. 1–40, 1971, and Brooks et al. *"Continuity and compactness of measures,"* Adv. in Math. 37 pp. 16–26, 1980.

Segmentation

Another way of extracting and representing information is to group the data or signals into regions of similarity. This process is commonly called segmentation. There are two main approaches to segmentation: region splitting, and region growing.

Region Splitting

The basic idea of region splitting is to break the information into a set of disjoint regions that are internally coherent (similar). If only a splitting scheme is utilized to obtain the regions, then the final segmentation probably contains a large number of neighboring regions that have identical or similar properties. Thus, a merging process is used after each split. The merging process compares adjacent regions and merges the regions into a single larger region wherever possible. Methods of this type are called split and merge methods. Split and merge methods can result in elongated regions and staggered region boundaries.

Region Growing

Region growing is the opposite of split and merge. In region growing, the method starts with some manageable number of "seed" points. The seeds can be in random or regular patterns, or the seeding can be based on local minimum or maximum values. Starting with one seed, perhaps a global minimum, neighboring data points having similarity characteristics or "features" as the seed are grown into regions of similarity in a bottom-up manner. In videos, pixel intensity is a good similarity measure for video object plane (VOP) segmentation. Usually more than feature is used, particularly when the best segmentation feature, such as signal intensity, is subject to noise. For example, in videos, the similarity measure can also consider texture, gradient, or geometric properties.

Region growing also has problems. In order to reduce the effects of noise, the regions can become excessively smooth. Moreover, it can be difficult to resolve ambiguities around edges of adjacent regions. Also, because region growing also does not consider compactness, previously grown regions can influence how subsequent regions are grown. Simultaneous growing of regions from multiple seeds can overcome the domination problem, however, different choices of the seeds usually gives different segmentation results.

Therefore, there is a need for a method that can measure the relative compactness of data and signal sets while clustering or segmenting very large data sets.

SUMMARY OF THE INVENTION

The invention provides a method for determining a compactness ratio of data sets. A combined compactness value is measured for a union of the data sets, and an individual compactness value is determined for each one data sets. The combined value is divided by a sum of the individual compactness values to determine the compactness ratio of the plurality of data sets.

The compactness values can be determined by measuring an area of a particular data set, measuring a border of the particular data set, and dividing the area by the border squared to determine a particular compactness value of the particular data set.

BRIEF DESCRIPTION OF THE DRAWINGS

FIGS. 1a–b are front views of closed forms;

FIGS. 2a–b are views of maximum chords used for a compactness measure;

FIGS. 3a–b are images of segmented video objects before and after merging; and

DETAILED DESCRIPTION OF THE PREFERRED EMBODIMENT

Figure 4:
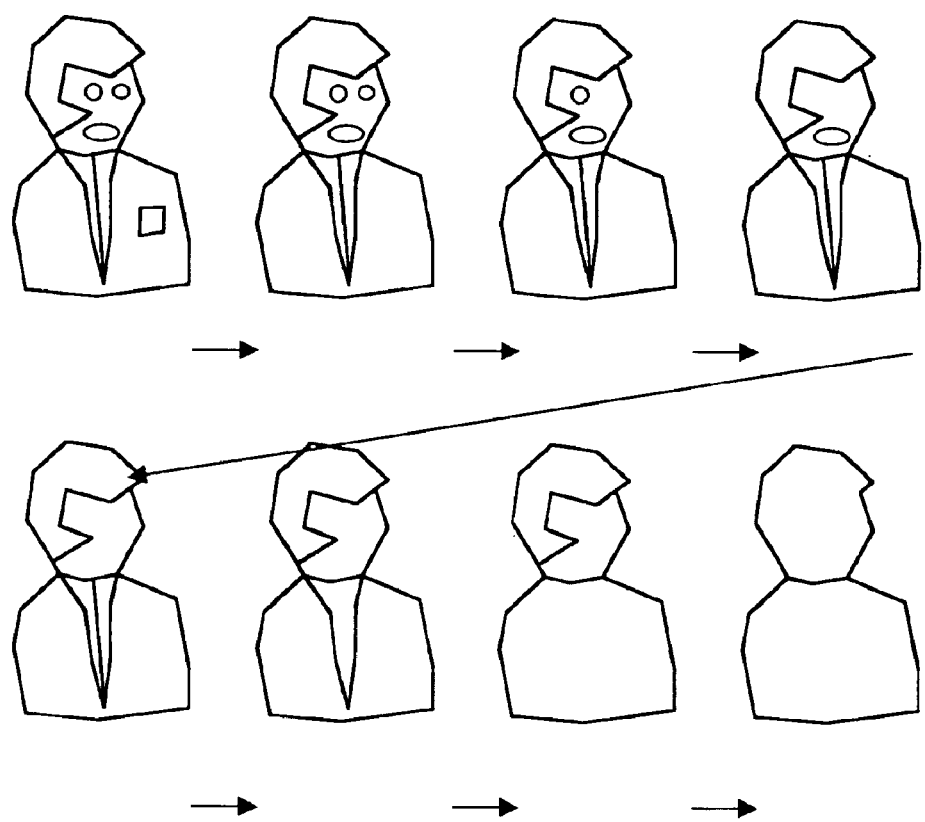
FIG. 4 is a view of a sequence of merge operations on video objects using compactness ratios according to the invention to construct a multi-resolution object tree.

My invention provides a method for measuring the similarity of closed data or signal sets (information) using a compactness ratio. Closed forms correspond to areas in 2-D coordinate systems, volumes in 3-D systems, and more complex forms in higher dimensions. Compactness is a value that generally indicates a spatial arrangement of the data, vectors, or signals that are grouped in a given area or volume. Therefore, a compactness value considers shape characteristics, the uniformity of the spatial distribution, and the density of the closed forms.

To determine a first compactness value $C_f$ of a closed form $f^N$, where N is the dimensionality of the domain $R^N$, I measure the "size" and "border" of the closed $$C_f = \frac{size}{border^2}$$

form, and express the compactness as:

In 2-D, the size is the area of the closed form, and the border is its perimeter. In 3-D, the size corresponds to the volume of the form, and the border corresponds to its surface. This compactness measure has a highest value when data points, signals, or vectors have a minimal distance from the center of mass of the form, i.e., a circular disk in 2-D, or a spherical volume in 3-D. For any other shape, the compactness measure is smaller.

My invention is particularly useful for measuring the compactness of complex forms, for example, the forms that are due to the trajectory of video object planes in a sequence of video frames, see U.S. patent application Ser. No. 09/826, 333 "Method for Segmenting Multi-Resolution Video Objects" filed by Porikli et al. on, Apr. 4, 2004, and incorporated herein by reference.

There, the forms are "lumps" of pixels in adjacent frames related by similar features, e.g., color, intensity, and motion. For example, a closed volume of pixels, i.e., a video object, might represent an acrobat tumbling through the air. Clearly, comparing the compactness of such video objects is a complex task.

However, as shown in FIGS. 1a–b, a form with a "noisy" or highly textured border can have erroneous compactness values. The forms 101–102 have the same size, however, the compactness value for the first form 101 is higher than the second form 102, even though, the first form is elongated, and the second form appears more compact overall.

To overcome border dependencies, and as shown in FIGS. 2a–b, I devise a second definition of the compactness of a form. Instead of using the border of the form, I measure the length f of the maximum linear chord that connects any two points in the form.

$$C_f = \frac{size}{(chord)^2}$$

Compactness Ratio

Clustering methods used for data minimization, pattern analysis, artificial learning methods, texture/video/motion segmentation, data mining, and so forth, are highly dependent on similarity relational features of the regions in the data domain to determine whether a region should be segmented, as in coarse-to-fine approach, or whether regions should be clustered, as in fine-to-coarse approach.

In addition, relational features are important to understand and extract formation from data. The method according to the invention provides a method to determine a compactness ratio that measures the compactness change of the forms (data sets) before and after the forms combined or split. Thus, when it is possible to combine a particular form with any one of a number of adjacent forms, the adjacent form that yields the most compact combination can be selected. The compactness ratio can also be used optimally divide forms.

The compactness ratio $CR_{ff}$ compares the compactness of multiple forms, where M is the total number of the forms, a nd N is the dimensionality of the signal space. The value M is included for normalization purposes. For applications where normalization is not required, M can be set to one. When, the signals are pixel color and intensity values, in a sequence of frames, N is three.

In words, the compactness ration is the compactness value of a union of the data sets, divided by the sum of the compactness values of the individual data sets.

The compactness ratio as determined above, uses the compactness measures, which, as stated above, can be based on the size and border. In which the above equation becomes $$CR_{f_1 \cdot f_M} = M \frac{C_{(f_1 \cup \cup f_M)}}{C_{f_1} + \ldots + C_{f_M}}$$

$$CR_{f_1 \ f_M} = M \frac{\sum_{m=1}^{M} size_m}{\left( \sum_{m=1}^{M} border_m + \ldots + \sum_{n=2}^{N} (-1)^n \sum_{\substack{m_1=1, m_n=1 \\ m_1 \neq m_2 \neq m_n}}^{M} border_{m_1 m_n} \right)^2}{\frac{size_1}{border_1^2} + \ldots + \frac{size_M}{border_M^2}}$$

Alternatively, the compactness measure considers the maximum chord of each closed form, or other uniformity distribution measures.

APPLICATIONS

There are various possible applications of this useful compactness ratio. It can be used in a split-merge based color segmentation process to determine whether color histograms of two regions are more consistent, or not, after merging, see the above related Patent Application. In a biological application, the compactness ratio can be used to differentiate between round-shaped and stick-shaped microorganisms. The compactness ratio can also be used by data minimization processes to obtaining the most compact combination of forms in higher coordinate domains out of many possible combinations.

It should be evident now, that the compactness measure is a self-descriptor of a single form, while the compactness ratio is a mutual descriptor of multiple forms.

EXAMPLES

The compactness ratio can be used to decide which of the region pairs should be combined to obtain a more compact representation. Here, the regions represent segments of an image of a sliced apple, e.g., slice pairs 301–302, 302–303, or 303–301.

If a1 and p1 are the area and border of region 301, a2 and p2 the area and border of region 302, and a3 and p3 the area and border of region 303, then $$C_1 = \frac{a_1}{p_1^2}$$

$$C_2 = \frac{a_2}{p_2^2} \qquad CR_{13} = \frac{C_{13}}{C_1 + C_3}$$

$$C_3 = \frac{a_3}{p_3^2} \Rightarrow CR_{21} = \frac{C_{21}}{C_1 + C_2}$$

$$C_{13} = \frac{a_1 + a_3}{(p_1 \cup p_3)^2} \qquad CR_{23} = \frac{C_{23}}{C_2 + C_3}$$

$$C_{21} = \frac{a_1 + a_2}{(p_1 \cup p_2)^2}$$

$$C_{23} = \frac{a_2 + a_3}{(p_2 \cup p_2)^2}$$

and $$C_1 > C_3 > C_2$$
$$C_{23} > C_{21} > C_{13}$$
$$C_{23} > \frac{C_2 + C_3}{2} \Rightarrow CR_{23} \gg CR_{21} > CR_{13}$$
$$C_{21} < \frac{C_1 + C_2}{2}$$
$$C_{13} < \frac{C_1 + C_3}{2}$$

FIG. 3*b* shows the merge that selects the pair having the maximum compactness ratio.

Video Object Segmentation

As shown in FIG. 4, the compactness ratio can similarly be used when merging similar video object volumes to obtain a multi-resolution object tree as described in the related Patent Application referenced above. Here, the similarity is based on self-descriptors and mutual-descriptors of the objects, and compactness ratios of pairs of objects, are determined at each stage of the tree building, as shown by the arrows. By selecting the pair of regions with the highest compactness ratio, the video object tree is properly constructed.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A method for determining a compactness ratio of a plurality of data sets, comprising:
    measuring a combined compactness value for a union of the plurality of data sets;
    measuring an individual compactness value for each one of the plurality of data sets; and
    dividing the combined compactness value by a sum of the individual compactness values to determine the compactness ratio of the plurality of data sets.
2. The method of claim 1 further comprising:
    measuring an area of a particular data set;
    measuring a border of the particular data set; and
    dividing the area by the border squared to determine a particular compactness value of the particular data set.
3. The method of claim 1 further comprising:
    measuring an area of a particular data set;
    measuring a maximum linear chord connecting any two points of the particular data set; and dividing the area by the maximum linear chord to determine a particular compactness value of the particular data set.

4. The method of claim 1 wherein the compactness ratio is:

$$CR_{f_1 \ldots f_M} = M \frac{C_{(f_1 \cup \ldots \cup f_M)}}{C_{f_1} + \ldots + C_{f_M}}$$

where M is the total number of data sets.

5. The method of claim 1 wherein the data sets are composed of pixels in a sequence of video frames.

6. The method of claim 1 further comprising:

determining a plurality of compactness ratios, one compactness ratio for each possible pair of data sets; and combining the pair of data sets having a maximum compactness ratio.

* * * * *